United States Patent
Harron et al.

(10) Patent No.: US 9,683,581 B2
(45) Date of Patent: Jun. 20, 2017

(54) FILLED STATIC STRUCTURE FOR AXIAL-FLOW MACHINE

(71) Applicant: ROLLS-ROYCE PLC, London (GB)

(72) Inventors: Roy John Harron, Bristol (GB); James Charles Pearce, Surrey (GB)

(73) Assignee: ROLLS-ROYCE plc, London (GB)

( * ) Notice: Subject to any disclaimer, the term of this patent is extended or adjusted under 35 U.S.C. 154(b) by 961 days.

(21) Appl. No.: 13/973,323

(22) Filed: Aug. 22, 2013

(65) Prior Publication Data

US 2014/0072407 A1  Mar. 13, 2014

(30) Foreign Application Priority Data

Sep. 13, 2012 (GB) .................................. 1216343.2

(51) Int. Cl.
| | | |
|---|---|---|
| F01D 5/00 | (2006.01) | |
| F04D 29/60 | (2006.01) | |
| F01D 5/16 | (2006.01) | |
| F01D 9/04 | (2006.01) | |
| F04D 29/66 | (2006.01) | |
| F04D 29/40 | (2006.01) | |
| F04D 29/54 | (2006.01) | |

(52) U.S. Cl.
CPC ............. *F04D 29/601* (2013.01); *F01D 5/16* (2013.01); *F01D 9/04* (2013.01); *F04D 29/403* (2013.01); *F04D 29/542* (2013.01); *F04D 29/668* (2013.01); *F05D 2260/96* (2013.01); *Y02T 50/672* (2013.01); *Y10T 29/49323* (2015.01)

(58) Field of Classification Search
CPC ..... F01D 5/16; F01D 9/04; F01D 5/26; F01D 25/04; F01D 25/06; F05D 2260/96

USPC .......................................................... 415/119
See application file for complete search history.

(56) References Cited

U.S. PATENT DOCUMENTS

| | | | |
|---|---|---|---|
| 6,969,239 B2 | 11/2005 | Grant et al. | |
| 7,753,654 B2* | 7/2010 | Read ...................... | F01D 5/147 416/229 R |
| 8,087,881 B1 | 1/2012 | Cardoso, III et al. | |
| 2005/0186082 A1 | 8/2005 | Kayser et al. | |
| 2009/0056126 A1* | 3/2009 | Chivers ................... | F01D 5/147 29/889.2 |

(Continued)

FOREIGN PATENT DOCUMENTS

| | | |
|---|---|---|
| GB | 2 450 937 A | 1/2009 |
| JP | A-2005-163789 | 6/2005 |

OTHER PUBLICATIONS

Jan. 16, 2013 Search Report issued in British Application No. GB1216343.2.

*Primary Examiner* — Jason Shanske

(74) *Attorney, Agent, or Firm* — Oliff PLC

(57) ABSTRACT

A stator assembly for a rotary machine having a rotor arranged to rotate about an axis in use. The stator assembly has a circumferential support member or casing arranged about said axis and a plurality of elements extending in a substantially radial direction from the support. The elements have a platform at an end thereof for engagement within the support, wherein the elements each comprise a hollow internal cavity having an opening through the platform at the end of the element, wherein said internal cavity is filled with a vibration damping material. The elements may be filled vanes in a gas turbine engine compressor. The platforms may also be filled with the vibration damping material.

13 Claims, 3 Drawing Sheets

(56) References Cited

U.S. PATENT DOCUMENTS

2010/0098537 A1* 4/2010 Hamana .................. F01D 9/041
415/209.3

* cited by examiner

FILLED STATIC STRUCTURE FOR AXIAL-FLOW MACHINE

The present invention relates to static assemblies, such as vane or strut assemblies, in axial flow machines. More particularly, the invention relates to such structures that are filled with a secondary material.

It is known to insert a vibration damping material into certain structures of high speed machines, such as gas turbine engines. The structure may be provided with an internal cavity in order to accommodate the insertion of the damping material. The damping material changes the vibration response of the structure and may, for example, avoid resonance occurring within a predetermined operational range of the machine.

For a stator vane within a gas turbine engine compressor, an internal cavity extends parts-way along the vane length and a fill hole is provided through the vane wall to allow injection filling of the vane with a suitable damping material via the side surface. A vent hole is also provided on the opposing side surface to allow the escape of air such that the damping material can completely fill the cavity. The filling process may be aided by application of a vacuum via the vent hole to evacuate the cavity and draw the damping material there-through.

It is a disadvantage of existing systems that each vane must be individually filled, thereby incurring cost penalties during manufacture. Furthermore the fill and vent holes act as stress concentration features such that fatigue cracks due to vibration in use can propagate from such holes. The presence of such crack-initiating features thus reduces the strength of the vane.

It is also known to provide further vibration damping features at the vicinity of the interface between the vane platform and the adjacent casing structure. Such a vibration damping member is disclosed, for example, in U.S. Pat. No. 6,969,239 and is intended to dampen vibrations transmitted between the vane and casing. U.S. Pat. No. 8,087,881 discloses the use of a vibration damping horn. Such features can increase the life of the vanes and the associated assembly but carry increased cost and complexity penalties.

It is an aim of the present invention to provide an assembly which offers reduced manufacturing cost and complexity. It may be considered an alternative or additional aim to provide an assembly which can offer improved strength and/or vibration response.

According to a first aspect of the invention there is provided a stator assembly for a rotary machine having a rotor arranged to rotate about an axis in use, the stator assembly comprising a circumferential support member arranged about said axis and a plurality of elements extending in a substantially radial direction from the support, the elements having a platform at an end thereof for engagement within the support, wherein the elements each comprise a hollow internal cavity having an opening through the platform at the end of the element, wherein said internal cavity is filled with a vibration damping material.

The invention has been found to be beneficial in providing a filling location for the element, for which the strength of the element is not significantly compromised.

Furthermore the location of a filling opening at the end of the element has been found to improve manufacturing efficiency since it is possible to fill a plurality of elements simultaneously or in quick succession.

The vibration damping material may extend into and/or through the opening. In one example of the invention the vanes may be overfilled with the vibration damping material, for example so that vibration damping material extends into a recess on an outer side of the opening.

The opening may comprise a first opening in each element located at a first end thereof. The element may comprise a further opening at a second end thereof. The further opening may be filled with said vibration damping material.

The elements may have a first platform at a first end thereof and a further platform at a second end thereof. The further openings may be provided in the further platform.

The elements may be shrouded.

The openings in the further platform may be filled with said vibration damping material. The further platform may have a recess or cavity which may be at least partially filled with the material. A unitary vibration damping material piece may fill the element and the corresponding openings and/or recesses in the first and/or further support members.

The internal cavity and the opening at either or both ends thereof may comprise a through passage along the length of the element. The through passage may extend in a substantially radial direction relative to the circumferential support.

A plurality of elements may have a common platform. The platform may have a single or else a plurality of spaced openings in respect of said plurality of elements. The platform may have fewer openings than elements. The platform may extend in a circumferential direction. One or more opening in the platform may feed the internal cavities of a plurality of elements in a manner akin to a manifold. A plurality of openings may be circumferentially or angularly spaced along the platform.

In one embodiment, the platform has a plurality of openings into the internal cavity of a single element.

In one embodiment, each element may have a plurality of internal cavities. The plurality of internal cavities may have a platform with a single opening therein. The platform may provide a manifold-like structure which feeds the plurality of internal cavities. Additionally or alternatively a platform may be provided having a plurality of openings corresponding to the plurality of cavities. The internal cavities may be separated by one or more internal walls or baffles within the element. The internal cavities may extend (e.g. in parallel) between the first and second ends of the element.

The support member may have an opening for supplying the vibration damping material to the opening in the platform of one or more element. A circumferential cavity may be defined between the support member and element platform which may be at least partially filled with the vibration damping material. The support member may have a plurality of circumferentially or angularly spaced openings, for example, which may be aligned with one or more openings of the elements. The openings may be radially aligned or oriented. The elements may be filled via the support platform.

The elements may be filled with the vibration damping material such that at least a portion of the platform comprises said material. The platforms may be hollow.

A unitary piece of vibration damping material may extend between the platform and the internal cavity of the element via the opening. This may serve to improve the vibration response of the assembly as a whole, thereby negating or reducing any need to provide further vibration damping means at the interface between the elements/platforms and the support.

The platform or support may comprise a recess or cavity, which comprises said vibration damping material. The recess may be partially or completely filled with said material. The recess may be, for example, substantially elliptical or rectangular in shape (e.g. in plan or section).

The recess in the platform and the internal cavity of the corresponding element may comprise a common cavity formation, which may be filled with said vibration damping material. The platform recess may have a dimension (e.g. a width dimension) which is greater than that of the element recess.

In one embodiment, the elements are arranged to extend into a fluid passageway through the machine, such as an annular passage. The assembly may comprise a compressor stator assembly. The elements may comprise stator vanes. The elements may comprise aerofoils.

The invention has been found to provide a further benefit in that the fill and vent holes can be removed from the fluid washed surfaces of the elements. Thus the aerodynamic surfaces of the elements need not have discontinuities therein. According to the prior art, the holes in the gas washed surfaces of the vanes are required to be filled and machined/finished such that the filled hole provides a minimal disruption to the airflow there-over in use. Any protrusion or depression in the gas washed surface reduces aerodynamic performance and accordingly the cost and complexity of the removal of discontinuities according to the prior art can be avoided by the present invention.

The fill and/or vent holes according to the invention and/or the damping material therein may be removed from, or isolated from, the gas path through the machine (i.e. the primary gas path of the working fluid), for example by a wall of the platform or elements.

The rotary machine may comprise an axial flow machine. The machine may comprise a high speed machine, for example arranged to operate at rotation speeds in excess of 1,000 RPM and more-typically greater than 3,000 RPM. The machine may comprise a turbo-machine such as a gas turbine engine.

In some embodiments, the elements may comprise struts, such as support struts.

In one embodiment, the elements may be individually attachable to the support via the platform. In another embodiment a plurality of elements may be provided as a single body such that the plurality of elements is attached to the support by a common fixing. A common recess or reservoir in the support may communicate with the plurality of elements via one or more openings. A common or unitary body of vibration damping material may fill the plurality of elements and corresponding recess in the support.

The circumferential support member may comprise a casing, for example an engine casing.

The circumferential support member may comprise a first support member. The assembly may comprise a further circumferential support member which may be substantially concentrically arranged with the first support member. The first support member may be a radially inner or outer support member. The elements are preferably supported at their opposing ends by the first and further support members.

The further support member may communicate with openings in the second end of the elements. The further support may have a plurality of angularly or circumferentially spaced openings arranged to be aligned with the openings in the elements. The openings in the further support may be substantially aligned with openings in the first support member.

The elements, including the platform may be formed of a first material which may be metallic. The vibration damping material may be polymeric and/or visco-elastic.

According to a second aspect of the invention, there is provided a stator for an axial flow machine, the stator comprising a body having first and second ends and a platform at the first end thereof for engagement within a circumferential support, wherein the body comprises an outer wall extending from the platform to the second end, said wall defining a hollow internal cavity along the length of the body, wherein the platform has an opening into said internal cavity and said internal cavity is filled with a vibration damping material.

An end portion of the internal cavity may be defined by the platform.

According to a third aspect of the invention there is provided a method of manufacture of a stator assembly for a rotary machine having a rotor arranged to rotate about an axis in use, the method comprising providing a circumferential support member to be arranged in use about said axis and attaching a plurality of elements to the support, each element being attached to the support at a platform formation at a first end of the element such that the elements extend in a substantially radial direction from the support, wherein the elements each comprise a hollow internal cavity having an opening at the first end thereof through the platform, and filling the internal cavity of each element with a vibration damping material through the opening.

The elements may be filled prior to attachment to the support member or else whilst they are attached to the support member. The elements may be attached to the support member in a circumferential array. A plurality of elements may be filled with the damping material simultaneously. The damping material may be inserted into the elements in liquid form. The damping material may solidify in situ.

The support member may comprise one or more opening. The element openings may be aligned with, or offset from, the support member openings such that the elements can be filled therethrough. Alternatively, the support member may be devoid of filling openings.

The platform may have an outer or end wall in which the opening is provided, for example, so as to define a first internal cavity portion within the element and an adjoining second internal cavity portion within the platform. Both the first and second internal cavity portions may be filled via the opening, for example prior to attachment of the elements to the support member.

The elements may be overfilled with said damping material such that a portion of the platform or support, typically about the openings therein, is at least partially filled with said material.

A further support may be provided. The elements may be attached to the further support at their second ends. The elements may be filled via the openings in their first or second ends.

The vibration damping material may be inserted under pressure in liquid form into the opening in one end of each element. A negative pressure or vacuum may be applied to an opening in an opposing end of each element during filling, for example to draw the damping material into the internal cavity.

A further advantage offered by the invention is that the platforms are typically thicker than vane panels and this has been found to avoid problems associated with the prior art, in which the ease of fill of stator vanes has been found to be hampered based on lower than ideal vane panel thickness.

Any of the preferable features defined in relation to any one aspect of the invention may be applied to any further aspect.

Practicable embodiments of the invention are described in further detail below by way of example only with reference to the accompanying drawings, of which:

The invention derives, in general, from the concept of filling a hollow stator component with a vibration-damping material through its end wall platform arrangement.

Figure 1:
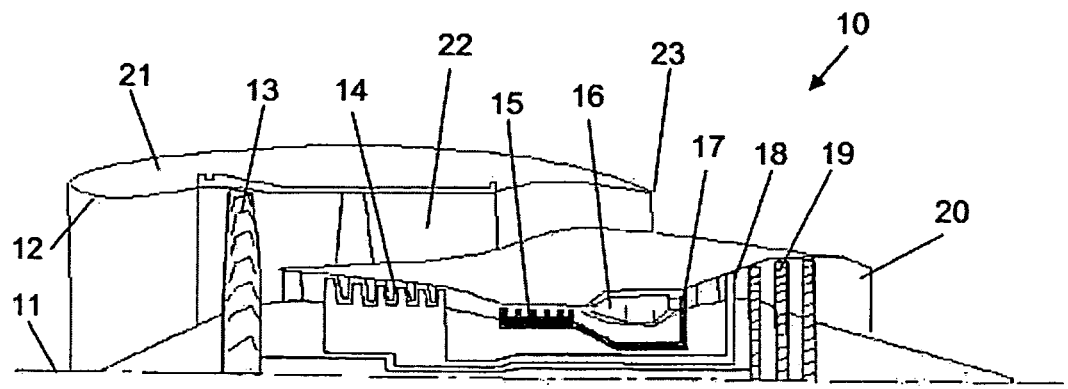
FIG. 1 shows a half longitudinal section of a gas turbine engine to which the present invention may be applied.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Alternative gas turbine engine arrangements may comprise a two, as opposed to three, shaft arrangement, a boosted two-shaft arrangement and/or may provide for different bypass ratios. Other configurations known to the skilled person include open rotor designs, such as turboprop engines, or else turbojets, in which the bypass duct is removed such that all air flow passes through the core engine. The various available gas turbine engine configurations are typically adapted to suit an intended operation which may include aerospace, marine, power generation amongst other propulsion or industrial pumping applications.

The intermediate and high pressure compressors 14, 15 comprise a plurality of compressor stages, comprising a row of rotor blades and adjacent stator vanes.

Figure 2:
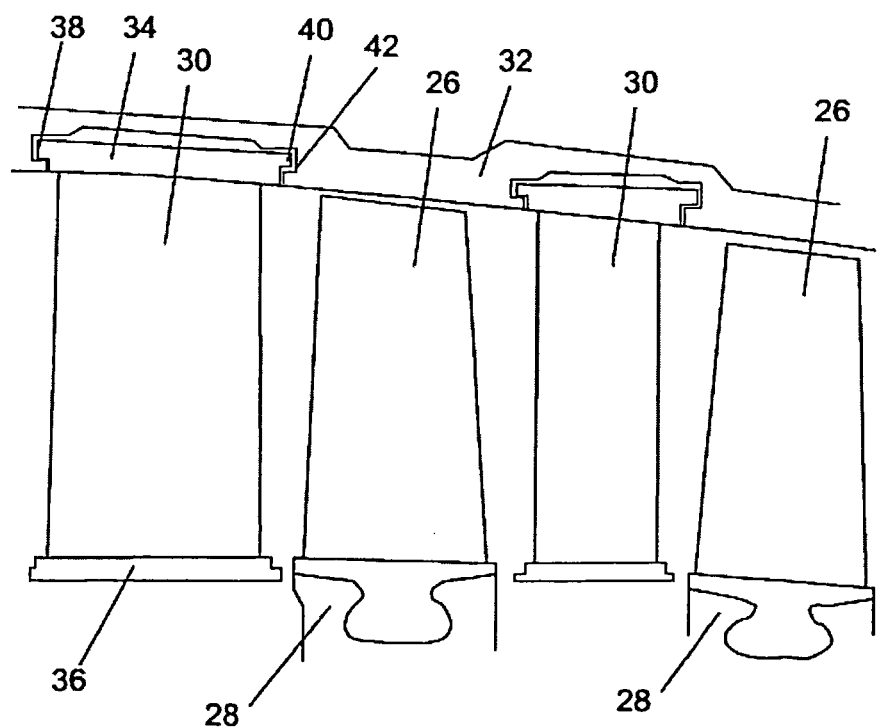
FIG. 2 shows a schematic partial longitudinal section through an assembly according to one example of the invention.

A schematic longitudinal section through such a compressor is shown in FIG. 2. The compressor 24 has a bladed rotor comprising a series of rows of blades, each of which comprise a circumferential array of blades 26 mounted on a corresponding disk 28.

Between adjacent rows of rotor blades 26, there is provided a stator vane assembly comprising a circumferential array of stator vanes 30 mounted to a circumferentially extending casing structure 32. The vanes extend across the annular flow passage formed between the radially inner surface of the casing 32 and the outer surface of the disks 28. The blades and vanes are typically aerofoil in section.

In this embodiment, shrouded vanes are shown in that both of the radially inner and outer ends of the vanes 30 have a platform formation 34, 36 respectively. The combined outer platforms 34 of the array of vanes 30 form an annular wall defining a portion of the outer flow passage wall. The combined inner platforms 36 form an annular wall defining a portion of the inner flow passage wall.

The platforms 34, 36 have a dimension in the axial direction which is greater than the chord length of the vanes 30 so as to define an overhang 38, 40 at the leading (front) and trailing (rear) edges of the platform. The overhang defines a lip or rail formation by which each vane can be held fast in a correspondingly shaped groove 42 within the casing 32. The groove 42 comprises a circumferentially extending recess into which the platforms can be inserted to assemble the circumferential array of stator vanes.

In a shrouded configuration the inner platforms 36 of a row of vanes may be fastened to a common inner shroud ring (not shown) via one or more conventional fastening arrangements.

The vanes, including the platforms, may be formed using conventional materials such as titanium, steel or nickel. The vanes according to various aspects of the present invention have a hollow interior to be filled with a vibration damping material as will be described below. More specifically the aerofoil portion has a leading edge, a trailing edge, a concave metal wall portion extending from the leading edge to the trailing edge and a convex metal wall portion extending from the leading edge to the trailing edge. The concave metal wall portion and the convex metal wall portion form a continuous integral metal wall having the hollow interior.

Such a vibration damping material may comprise or consist of an elastomer. It will be appreciated that a suitable elastomeric, or other material, will typically be able to retain its material properties under the normal operating temperatures (typically up to or greater than 100, 150 or 200° C.).

Fixed or variable inlet guide vanes (not shown) may also be provided upstream of the first row of compressor blades to direct the flow onto the blades at an optimum angle for compression. Any such vanes or other guide vanes located in annular flow passages within in a gas turbine engine may be encompassed by the present invention.

Figure 3:
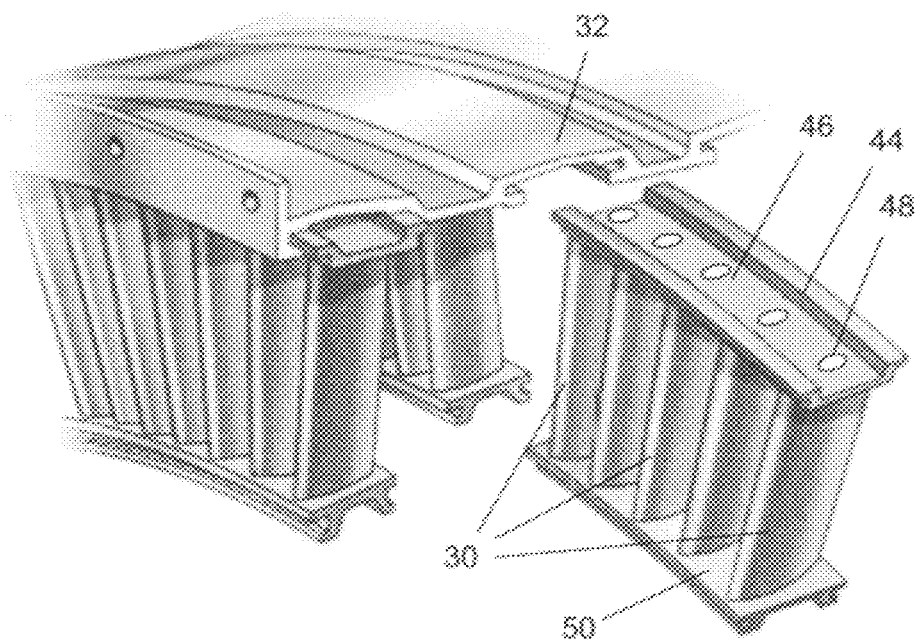
FIG. 3 shows a cut-away three-dimensional view of a portion of a stator assembly according to an example of the invention.

In FIG. 3, there is shown a portion of a vane array according to one example of the invention. A plurality of vanes 30 are provided on a common platform formation 44, which provides an arcuate section of the circumferential array. In this embodiment the platform has a circumferential channel 46, the base of which defines the end walls of the vanes 30. In that wall, there are provided a plurality of openings 48 which lead into the interior cavity of each vane.

A corresponding plurality of openings is also provided in the wall of the radially-inner common platform formation 50, such that a through-cavity from one end of the vane to the other is defined.

During manufacture, the vanes and platforms 44, 50 are commonly formed using conventional techniques. The openings may be co-formed in the ends of the vanes or else may be later formed, for example by drilling through the inner and outer platforms. The vanes 30 are subsequently filled with vibration-damping material by injecting molten material through the openings 48. A vacuum may be applied to the openings in the inner platform to draw the molten material though the vane in a controlled manner. The vibration damping material is allowed to cool and solidify in situ.

In this embodiment, the vanes may be overfilled with the vibration damping material such that the channel 46 is at least partially filled with the material.

Figure 4:
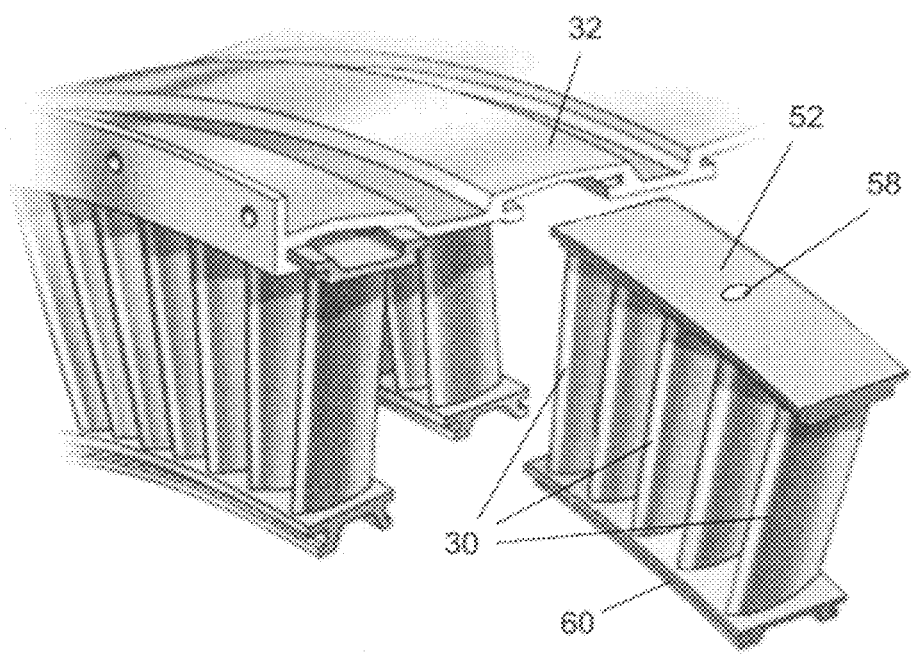
FIG. 4 shows a cut-away three-dimensional view of a portion of a stator assembly according to another embodiment of the invention.
Figure 5:
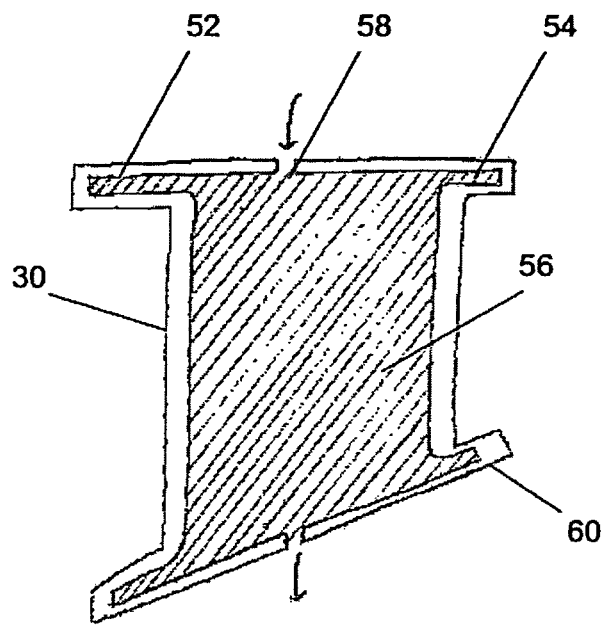
FIG. 5 shows a longitudinal section through a vane according to one example of the invention; and, FIG. 6 shows a longitudinal section through a plurality of vanes according to another example of the invention.

Turning now to FIG. 4, it can be seen that the platform arrangement of FIG. 3 has been modified so as to present an outer wall 52 covering the channel 46 of the platform. Accordingly the platform itself now comprises a hollow and/or enclosed interior defining an internal cavity. That cavity may be an extension and/or manifold portion for the vane cavities. A section view through one vane 30 of that configuration is shown in FIG. 5.

In this embodiment the platform cavity 54 is larger in an axial direction (i.e. a fore-and-aft direction) than the internal cavity 56 of the vane. The platform cavity may comprise a rectangular or elliptical cavity shape within the centre of the platforms.

A single fill opening 58 is provided in the outer wall 52 of the platform such that a plurality of vanes 30 can be filled in one operation. As single opening, or else a plurality of openings, may be provided in the outer wall of the opposing platform 60. In this embodiment the opposing platform is hollow in the manner described above so as to define a further platform cavity which is also an extension and/or manifold portion for the vane cavities as shown in FIG. 5. However in alternative embodiments, the platform 60 may take the form of an open channel configuration, similar to that shown in FIGS. 3 and 4. Multiple openings in the platform 60 may provide vent holes such that the damping material can be drawn through all vanes in a uniform manner.

Once the vane pack comprising vanes 30 and platform(s) has been formed using conventional techniques, the vibration damping material can be injected into opening 58 and/or drawn through the vanes 30 via the vent hole(s) in the opposing platform such that the entire internal cavity, including the portions 54 and 56 is filled in one operation. The common platform cavity serves to collect and distribute the damping material before it flows down into the number of vanes connected to the platform cavity. The damping material cools in situ to provide a solid composite body.

Using the methods described above, a stator assembly can be provided in which the entire length or span (i.e. in a radial direction) of the vane and platform can be filled with a unitary body of visco-elastic damping material.

Once filled the individual vanes or vane arrays described above can be assembled within the casing 32 in a conventional manner.

The embodiment described above has the advantage of reducing the manufacturing time and cost savings by reduction in the number of required fill operations.

In an alternative embodiment, the holes used for fill and vent purposes can be swapped so that the vane is filled from the inner platform, and vented through the outer platform. In any embodiment, the injection and drawing of damping material into the vanes at the opposing ends thereof can be used to provide a capping head of damping material through the fill and vent openings.

Figure 6:
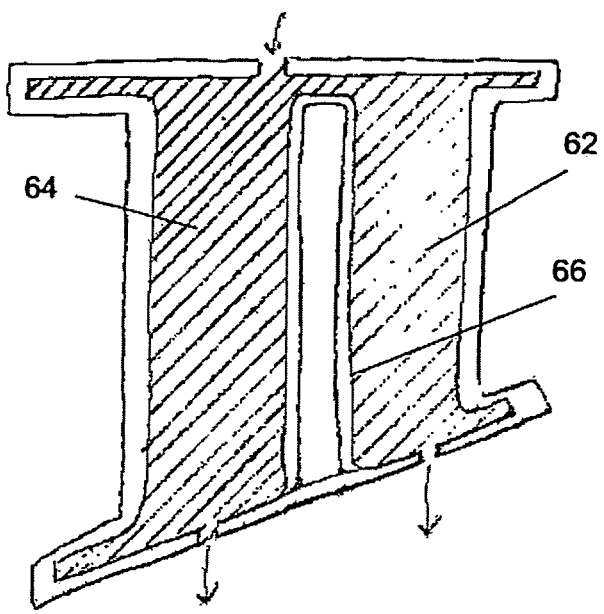

In FIG. 6, there is shown a further embodiment in which a plurality of internal channels 62, 64 are provided in a parallel arrangement within a single vane. An internal dividing wall or baffle 66 separates the vane cavity so as to define the separate channels. In this embodiment, the channels 62, 64 are arranged in a for-and-aft orientation. The dividing wall 66 stops short of the end wall (i.e. it does not extend fully through the platform cavity) so that a single opening can feed the channels 62, 64 in a single filling operation as described above. The vane is otherwise as described above in relation to the foregoing figures.

The use of channels in the vane interior allows non-uniform material properties through different regions of the vane, which may be useful in optimising the vane for its intended use and/or vibration response.

Additionally or alternatively the invention may be applied to a multi stator vane arrangement in which a plurality of vanes are held in a fore-and-aft orientation (e.g. axial direction) with respect to the fluid flow in use. A dual or tandem vane arrangement may be provided in this manner whereby a single vane surface is effectively split into two or more spaced vane portions for aerodynamic and/or weight benefits. The vanes may be supported by a common platform (i.e. extending in an axial direction) and may therefore be subject to vane filling in the manner described above in conjunction with the present invention. Thus any or any combination of circumferentially of axially extending platforms may be accommodated by the invention, for example to allow multi vane filling in a single operation.

The removal of the fill and vent holes from the vane surfaces in accordance with the invention is beneficial for blade vibration strength. The invention allows multiple vanes to be filled simultaneously if more than one blade is attached to a platform, decreasing manufacturing costs and time. Weight savings are also achieved due to the additional visco-elastic material in the platform portion of the cavity, which is of relatively low density compared to the metallic vane material.

The invention can also provide increased damping compared to prior art due to the extra visco-elastic material in the platform portion of the cavity.

The invention also has the advantage of minimising the platform bending stiffness decrease, due to the visco-elastic cavity portion of the platforms being close to the neutral axis. This benefit would allow increased platform thicknesses to be used than would otherwise be possible, due to weight penalties of thick solid platform designs.

In further developments of the invention, the pressure and suction surface panels of the vane could be formed substantially flat against one another, such that there is minimal internal cavity space therebetween. The vane is then heated to a temperature suitable to allow superplastic deformation to be achieved. Damping material could be injected at significantly higher pressure in a controlled manner so as to inflate the vane to the desired shape for use.

Furthermore, the principles of the present invention can be applied to other types of static (stator) structures within a machine such as a gas turbine engine, which structures undergo excitation in use and are required to be supported at one or more ends by a platform formation. For example, the principles of the invention can be applied to support struts, e.g. spoked strut designs, attached to continuous inner and outer rings or hubs. In such an embodiment the circumferential supports (i.e. the hub and outer ring) themselves may be formed in the manner of the platforms described above such that they have an internal cavity which can communicate with an internal cavity within the strut.

Openings may be drilled in the opposing ends of the struts and in the ring and hub. The struts can then be affixed to the circumferential supports, for example by welding, with the openings aligned. The entire assembly may then filled from a single, or small number of, fill hole locations, with venting occurring through a single vent hole, or several holes, in the inner hub. Several fill holes equally spaced around the outer ring may be provided in order to obtain an even distribution of visco-elastic flow through the struts.

The invention claimed is:

1. A stator assembly for a rotary machine having a rotor arranged to rotate about an axis in use, the stator assembly comprising:
   a circumferential support member arranged about said axis; and
   a plurality of elements extending in a substantially radial direction from the circumferential support member, one or more of said plurality of elements having a platform at an end thereof for engagement with the circumferential support member,
   wherein the one or more of said plurality of elements each comprise a hollow internal cavity having an opening through said platform at the end of the one or more of said plurality of elements, said internal cavity being filled with a vibration damping material, and
   wherein the opening comprises a first opening in a first platform at a first end of the one or more of said plurality of elements, the one or more of said plurality of elements comprising a further platform at a second end thereof, wherein a further opening is provided in the further platform such that the vibration damping material extends through the entire length of the one or more of said plurality of elements between the first and further openings.

2. The stator assembly according to claim 1, wherein the internal cavity of each of the one or more of said plurality of elements defines a radially-extending passage through the length of the one or more of said plurality of elements which is filled with a unitary piece of vibration damping material.

3. The stator assembly according to claim 1, wherein at least a portion of the platform is filled with the vibration damping material.

4. The stator assembly according to claim 3, wherein a unitary piece of vibration damping material extends between the platform and the internal cavity of the one or more of said plurality of elements.

5. The stator assembly according to claim 3, wherein the platform comprises a cavity, the cavity in the platform being provided at an end of the internal cavity of the corresponding one or more of said plurality of elements so as to form a common cavity formation within the one or more of said plurality of elements which is filled with said vibration damping material.

6. The stator assembly according to claim 5, wherein the cavity in the platform comprises an extension portion of the internal element cavity, said cavity having a lateral dimension which is greater than that of the internal cavity of the one or more of said plurality of elements.

7. The stator assembly according to claim 5, wherein the opening is spaced from the internal cavity of the one or more of said plurality of elements by the platform cavity.

8. The stator assembly according to claim 5, wherein the platform cavity is spaced from the internal cavity by the opening and the platform is shaped to provide an open cavity at the end of the one or more of said plurality of elements, said open cavity being bounded by the circumferential support member so as to define an enclosure which is at least partially filled with the vibration damping material.

9. The stator assembly according to claim 1, wherein said plurality of elements have a common platform, the platform having a cavity which communicates with the internal cavities of said plurality of elements.

10. The stator assembly according to claim 1, wherein each of the one or more of said plurality of elements has a plurality of internal cavities associated with a single platform, wherein said plurality of internal cavities are separated by one or more internal walls within the one or more of said plurality of elements.

11. The stator assembly according to claim 1, wherein the plurality of elements comprise stator vanes of a compressor and the circumferential support member comprises a casing structure.

12. A gas turbine engine comprising the stator assembly of claim 1.

13. A method of manufacture of a stator assembly for a rotary machine having a rotor arranged to rotate about an axis in use, the method comprising:
   providing a circumferential support member to be arranged in use about said axis;
   providing a plurality of elements arranged to be attached to the circumferential support member at a platform formation at a first end of the plurality of elements such that the plurality of elements extend in a radial direction from the circumferential support member, wherein the plurality of elements each comprise a hollow internal cavity having a first opening in a first platform at a first end of the plurality of elements, the plurality of elements comprising a further platform at a second end thereof, and wherein a further opening is provided in the further platform;
   filling the internal cavity of each of the plurality of elements with a vibration damping material through the first opening such that the vibration damping material extends through the entire length of the plurality of elements between the first and further openings; and
   attaching the plurality of elements to the circumferential support member.

* * * * *